3,133,051
WATER-INSOLUBLE METALLIFEROUS
AZO-DYESTUFFS
Ulrich Dreyer, Offenbach-Burgel, and Richard Gross, Frankfurt am Main, Germany, assignors to Farbwerke Hoechst Aktiengesellschaft vormals Meister Lucius & Brüning, Frankfurt am Main, Germany, a corporation of Germany
No Drawing. Filed Aug. 30, 1961, Ser. No. 134,856
Claims priority, application Germany Sept. 3, 1960
6 Claims. (Cl. 260—147)

The present invention relates to valuable new water-insoluble metalliferous azo-dyestuffs and to a process for preparing them; more particularly it relates to complex metal compounds of water-insoluble azo-dyestuffs corresponding to the following general formula

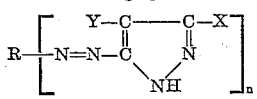

in which X represents a hydrogen atom, an alkyl, an alkyl cyanide, and aralkyl or an aryl radical Y represents a hydrogen atom, an alkyl, aryl or a cyanogen group, R represents the radical of an arylamide of an aromatic or heterocyclic ortho-hydroxycarboxylic acid or of an acylacetic acid, $n$ stands for one of the numbers 1 or 2.

We have found that new water-insoluble metalliferous azo-dyestuffs are obtained by coupling in substance, on the fiber or another substratum a diazonium compound of an amine which corresponds to the general formula

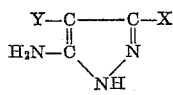

in which X represents a hydrogen atom, an alkyl, an alkyl cyanide, an aralkyl or an aryl radical and Y represents a hydrogen atom, an alkyl, aryl or a cyanogen group, with an arylamide of an aromatic or heterocyclic ortho-hydroxycarboxylic acid or of an acylacetic acid, the components being selected so that they are free from groups imparting solubility in water such, for example, as sulfonic acid or carboxylic acid groups, and treating the azo-dyestuff so obtained with an agent yielding metal.

As diazo components there are used in the process of the present invention 5-amino-pyrazoles of the above formula which may contain substituents in 3- and/or 4-position, such for example, as compounds that may be substituted in 3-position by a methyl, ethyl, propyl, methyl-cyanide, benzyl or phenyl radical and in 4-position by a cyanogen, methyl, ethyl, propyl, phenyl or naphthyl group. The aryl radicals may contain further substituents which do not impart solubility in water such, for example, as halogen atoms, alkyl or alkoxy groups. These compounds can be prepared by known methods, for example, by reacting acylaceto-nitriles, acyl-α-alkyl-aceto-nitriles or acyl-α-arylaceto-nitriles or malonic acid dinitrile with hydrazine hydrate.

As coupling components there are used in the process of the present invention the arylamides of aromatic or heterocyclic ortho-hydroxycarboxylic acids or of acylacetic acids such, for example, as the arylamides of 2:3-hydroxynaphthoic acid or the derivatives thereof substituted in 6-position, or arylamides of 3-hydroxyanthracene-3-carboxylic acid, cresotic acids, halogen-salicylic acids, 4-hydroxydiphenyl-3-carboxylic acid, 2-hydroxycarbazole-3-carboxylic acid, 5-hydroxy-1:2:1′:2′-benzocarbazole-4-carboxylic acid, 3-hydroxy-diphenylene oxide 2-carboxylic acid, 3-hydroxy-diphenylene sulfide 2-carboxylic acid, acetoacetic acid, benzoylacetic acid or terephthaloyl-bis-acetic acid. The diazotization of the diazo components used in accordance with the invention and the coupling with the coupling components can be carried out in known manner. The diazonium compounds of the 5-amino-pyrazoles are very stable and have a high coupling energy. Consequently, the coupling, which is preferably carried out in a weakly acid medium, takes place rapidly and completely.

The treatment of the water-insoluble azo-dyestuffs obtainable by the process of this invention with the agent yielding metal may be carried out by known methods during or after the coupling in substance or on the fiber. When the azo-dyestuff is produced on the fiber, the metallization may be conducted by adding the compound yielding metal to the developing bath or to the impregnation bath and causing the formation of the complex metal compound simultaneously with the formation of the dyestuff by raising the developing temperature. The treatment of the dyestuffs with the agents yielding metal after the coupling may be carried out in a second bath which is neutral, weakly acid or weakly alkaline and may contain dispersing agents or detergents, for example, a fatty alcohol polyglycol ether, and alkylphenol polyglycol ether, an alkylnaphthol polyglycol ether, a fatty acid poyglycol ester or a fatty acid amide polyglycol ester.

As agents yielding metal there are preferably used for the process of the present invention compounds yielding copper, cobalt, nickel, manganese, iron, chromium, vanadium, cadmium, zinc or lead, which may be inorganic or organic salts of these metals such, for example, as chlorides, bromides, sulfates, nitrates, formates or acetates, or complex compounds of these metals, especially with hydroxyalkylamines such, for example, as diethanolamine or triethanolamine, or with aminocarboxylic acids such, for example, as aminoacetic acid, nitrilotriacetic acid or ethylene-diamine-tetra-acetic acid, or with aliphatic hydroxycarboxylic acids such, for example, as citric acid or tartaric acid, or with alkali metal phosphates such, for example, as alkali metal polyphosphates and alkali metal pyrophosphates. When an agent yielding cobalt is used, the addition of an oxidizing agent such, for example, as an alkali metal chromate, an alkali metal perborate, an alkali metal percarbonate or an alkali metal persulfate, has a favorable effect on the metallization.

By dyeing or printing according to the ice color method there are produced on vegetable fibers, including fibers of regenerated cellulose, yellow-brown, claret, green, violet, blue and black dyeings, which possess a good fastness to light and to wet processing. The dyestuffs may be produced on vegetable fibers at a long goods-to-liquor ratio. Piece goods, warps or bands may be dyed in a continuous manner or printed by the base or naphtholate printing processes.

The new dyestuffs can also be produced on animal fibers such as wool or silk or on synthetic fibers, such as polyamide, acetyl cellulose or polyvinyl alcohol fibers by the usual dyeing processes for such fibers, and valuable dyeings possessing good properties of fastness are obtained.

The dyestuffs can also be prepared in substance and converted into complex metal compounds by treatment with an agent yielding metal. The metallization can be carried out in an aqueous suspension or in an organic solvent such, for example, as alcohol, acetone, dioxane or dimethyl formamide; in many cases the addition of pyridine accelerates the formation of the complex compound. The complex metal compounds so obtained usually exhibit a great coloring strength. They are suitable for coloring lacquers, printing inks and paints, for dyeing animal fibers, such as wool or silk, or synthetic fibers, such as polyamide, polyurethane, acetyl cellulose or polyester fibers, and also for coloring organic plastic masses of high molecular weight and spinning solutions.

The following examples serve to illustrate the invention but they are not intended to limit it thereto, the parts being by weight unless otherwise stated, and the relationship of parts by weight to parts by volume being the same as that of the kilogram to the liter.

*Example 1*

Cotton yarn was treated for 45 minutes at 35° C., at a goods-to-liquor ratio of 1:20, in the impregnation bath, prepared as described below, centrifuged and then developed, first for some minutes at 20° C. and then, after being slowly heated to 95° C., for 20 to 30 minutes at 90–95° C., in a developing bath prepared as described below. The yarn was then rinsed with a solution containing per liter of water, 3 cc. of hydrochloric acid of 20° Bé, soaped first for 15 minutes at 60° C. and then for 15 minutes at 95° C. with a solution containing, per liter of water, 1 gram of a reaction product from about 10 mols of ethylene oxide and 1 mol of isododecylphenyl, and 3 grams of sodium carbonate, rinsed again and dried.

*Impregnation bath.*—1.75 grams of 2-(2':3'-hydroxynaphthoylamino)-naphthalene were dissolved in 3.5 cc. of denatured ethyl alcohol, 0.9 cc. of sodium hydroxide solution of 38° Bé, 2 cc. of hot water and 0.9 cc. of formaldehyde solution of 30% strength.

The solution so obtained was made up to 1 liter with water at 45° C., 3 grams of a condensation product from fatty acids of high molecular weight and protein degradation products and 10 cc. of sodium hydroxide solution of 38° Bé.

*Developing bath.*—1.7 grams of 5-amino-3-methyl-4-phenyl-pyrazole in the form of a diazonium compound prepared in the usual manner were dissolved in 1 liter of water containing 1 gram of a reaction product from about 20 mols of ethylene oxide and 1 mol of octadecyl alcohol, 1.5 cc. of acetic acid of 50% strength, 7 grams of sodium acetate and 2.5 grams of copper sulfate.

A dark-blue dyeing having good properties of fastness was obtained.

*Example 2*

Cotton yarn was treated for 45 minutes at 35° C., at a goods-to-liquor ratio of 1:20 in the impregnation bath described in Example 1, centrifuged and then developed for 30 minutes at 20° C. in the developing bath prepared as described below. The material was then rinsed with a solution containing, per liter of water 3 cc. of hydrochloric acid of 20° Bé and treated, after being slowly heated to 95° C., for 20–30 minutes at 95° C. in the after-treatment bath prepared as described below. The yarn was then soaped for 15 minutes at 95° C. with a solution containing, per liter of water, 1 gram of a reaction product from about 10 mols of ethylene oxide and 1 mol of isododecylphenol, and 3 grams of sodium carbonate, rinsed and dried.

*Developing bath.*—1.6 grams of 5-amino-3-phenyl-pyrazole in the form of a diazonium compound prepared in the usual manner were dissolved in 1 liter of water containing 1 gram of a reaction product from about 20 mols of ethylene oxide and 1 mol of octadecyl alcohol, 1.5 cc. of acetic acid of 50% strength and 10 grams of sodium acetate.

*After-treatment bath.*—A mixture of 24 cc. of a cobalt chloride solution 1:10 and 110 cc. of an aqueous solution of the sodium salt of nitrilo-triacetic acid 1:10 was introduced into 1 liter of water containing 1 gram of a reaction product from about 10 mols of ethylene oxide and 1 mol of isododecylphenol and 1 gram of sodium carbonate.

A bluish green dyeing having good properties of fastness was obtained.

*Example 3*

29.3 parts of 1-(2',3'-hydroxynaphthoylamino)-2-methoxybenzene were made into a paste with 0.5 part of the reaction product from about 20 mols of ethylene oxide and 1 mol of oleyl alcohol and 40 parts by volume of sodium hydroxide solution of 23° Bé, and the paste was dissolved in 700 parts by volume of hot water. The solution was clarified by filtration and run, at 20–25° C., into a diazo solution which had been prepared as follows:

15.9 parts of 5-amino-3-phenyl-pyrazole were dissolved at room temperature in 500 parts by volume of water and 30 parts by volume of concentrated hydrochloric acid and diazotized by running a concentrated solution of 6.9 parts of sodium nitrite. 10 parts by volume of glacial acetic acid were added to the diazo solution so obtained and then clarified by filtration. The coupling to the azo-dyestuff took place rapidly. The coupling being complete, the yellow-red water-insoluble dyestuff was filtered off with suction and washed with water.

In order to convert the dyestuff into the complex nickel compound the moist filter cake was suspended in 800 parts by volume of acetone and mixed with a concentrated aqueous solution of 24 parts of crystallized nickel chloride and 60 parts by volume of pyridine. The mixture was heated at the boil under reflux for two hours, while stirring. The whole was then poured into 2000 parts by volume of water and 100 parts by volume of glacial acetic acid were added. The dyestuff so obtained was filtered off with suction, washed and dried. The product was a dark violet powder which was soluble in acetone and other organic solvents to give a carmine-red solution. The product is suitable for the preparation of lakes and for dyeing acetate rayon in the spinning mass.

In the following table further components are listed which can be used in the process of the invention, and also the tints produced by forming the metalliferous azo-dyestuffs from these components on the fiber.

| Diazo component | Coupling component | Tint | | | | | | |
|---|---|---|---|---|---|---|---|---|
| | | Copper complex compound | Cobalt complex compound | Nickel complex compound | Iron complex compound | Zinc complex compound | Manganese complex compound | Lead complex compound |
| 5-amino-3-methyl-4-phenyl-pyrazole. | 2,3-hydroxynaphthoyl-amino-benzene. | Dark blue. | Gray-black. | Claret. | Red-brown. | Claret. | Claret. | |
| Do. | 1-(2',3'-hydroxynaphthoylamino)-3-nitrobenzene. | ...do. | ...do. | ...do. | ...do. | ...do. | ...do. | |
| Do. | 1-(2',3'-hydroxynaphthoylamino)-naphthalene. | ...do. | ...do. | ...do. | ...do. | | | |
| Do. | 2-(2',3'-hydroxynaphthoylamino)-naphthalene. | ...do. | ...do. | ...do. | ...do. | Claret. | Claret. | |
| Do. | 1-(2',3'-hydroxynaphthoylamino)-2-methoxybenzene. | Dark blue. | ...do. | ...do. | ...do. | | | |
| Do. | 1-(2',3'-hydroxynaphthoylamino-2-methylbenzene. | ...do. | ...do. | ...do. | ...do. | | | |

| Diazo component | Coupling component | Tint | | | | | | |
|---|---|---|---|---|---|---|---|---|
| | | Copper complex compound | Cobalt complex compound | Nickel complex compound | Iron complex compound | Zinc complex compound | Manganese complex compound | Lead complex compound |
| Do | 1-(2',3'-hydroxynaphthoylamino-3-chlorobenzene. | Dark blue. | Gray-black. | Claret | Red-brown. | Claret | Claret | |
| Do | 1-(2',3'-hydroxynaphthoylamino)-2-methyl-4-chlorbenzene. | ---do | ---do | ---do | ---do | | ---do | |
| Do | 1-(2',3'-hydroxynaphthoylamino)-2,4-dimethoxy-5-chlorbenzene. | ---do | ---do | ---do | ---do | | ---do | |
| 5-amino-3-cyanomethyl-4-cyanopyrazole. | 2-(2',3'-hydroxynaphthoylamino)-naphthalene. | Blue-gray | Covered green. | Garnet | | | | |
| Do | 1-(2',3'-hydroxynaphthoylamino)-2-methyl-4-chlorbenzene. | ---do | ---do | ---do | | | | |
| Do | 1-(2'-hydroxy-anthracene-3'-carboylamino)-2-methyl-benzene. | Bluish green. | Green | | | | | |
| 5-amino-3-phenyl-pyrazole. | 2,3-hydroxy-naphthoylamino-benzene. | Red-violet. | Bluish green. | Claret | Red-brown. | | | |
| Do | 1-(2',3'-hydroxynaphthoylamino)-3-nitrobenzene. | ---do | ---do | ---do | ---do | | | |
| Do | 1-(2',3'-hydroxynaphthoylamino)-naphthalene. | ---do | ---do | ---do | Reddish brown. | | | |
| Do | 2-(2',3'-hydroxynaphthoylamino)-naphthalene. | ---do | ---do | ---do | Red-brown. | Bluish red. | | |
| Do | 1-(2',3'-hydroxynaphthoylamino)-2-methoxybenzene. | ---do | Bluish green. | ---do | | | | |
| Do | 1-(2',3'-hydroxynaphthoylamino)-2-methylbenzene. | ---do | ---do | ---do | | | | |
| Do | 1-(2',3'-hydroxynaphthoylamino)-4-chlorobenzene. | ---do | ---do | ---do | | | | |
| Do | 1-(2',3'-hydroxynaphthoylamino)-2-methyl-4-chlorobenzene. | ---do | ---do | ---do | | | | |
| Do | 1-(2',3'-hydroxynaphthoylamino)-2,4-di-methoxy-5-chlorobenzene. | ---do | ---do | ---do | | | | |
| Do | 1-(2',3'-hydroxynaphthoylamino)-2,5-di-methoxy-4-chlorobenzene. | ---do | ---do | ---do | | | | |
| Do | 1-(2'-hydroxycarbazole-3'-carboyl-amino)-4-chlorobenzene. | ---do | Gray-black. | Bluish brown. | Brown | | | Red-brown. |
| Do | 1-(2'-hydroxyanthracene-3'-carboylamino)-2-methylbenzene. | Bluish green. | Green | Green-blue. | | | | |
| Do | 2-(2',3'-hydroxynaphthoylamino)-3-methoxy-diphenylene-oxide. | Red violet. | Bluish green. | Claret | | | | |
| Do | 1-(5'-hydroxy-1',2'-1'',2''-benzo-carbazole-4'-carboylamino)-4-methoxybenzene. | Black | Black | Garnet | | | | |
| 5-amino-4-phenylpyrazole | 2,3-hydroxynaphthoylaminobenzene. | | Gray-black. | ---do | Red-brown. | Claret | Claret | |
| Do | 1-(2',3'-hydroxynaphthoylamino)-3-nitrobenzene. | Dark blue | ---do | ---do | ---do | ---do | ---do | |
| Do | 1-(2',3'-hydroxynaphthoylamino)-naphthalene. | ---do | ---do | ---do | ---do | | | |
| Do | 2-(2',3'-hydroxynaphthoylamino)-naphthalene. | ---do | ---do | ---do | ---do | Claret | Claret | |
| Do | 1-(2',3'-hydroxynaphthoylamino)-2-methoxybenzene. | ---do | ---do | ---do | ---do | | | Violet. |
| Do | 1-(2',3'-hydroxynaphthoylamino)-2-methylbenzene. | ---do | ---do | Bluish garnet. | ---do | | | |
| Do | 1-(2',3'-hydroxynaphthoylamino)-4-chlorobenzene. | ---do | ---do | ---do | ---do | Claret | | |
| Do | 1-(2',3'-hydroxynaphthoylamino)-2-methyl-4-chlorbenzene. | ---do | ---do | ---do | ---do | | | |
| Do | 1-(2',3'-hydroxythoylamino)-2,4-dimethoxy-5-chlorobenzene. | ---do | ---do | ---do | ---do | | | |
| Do | 1-(2',3'-hydroxynaphthoylamino)-2,5-di-methoxy-4-chlorobenzene. | ---do | ---do | ---do | ---do | | | |
| Do | 1-(2'-hydroxycarbazol-3'-carboyl-amino)-4-chlorobenzene. | Violet | Reddish dark blue. | Violet | Bluish brown. | Bluish garnet. | | Garnet. |
| Do | 1-(2'hydroxyanthracene-3'carboyl-amino(-2-methyl-benzene. | Bluish green. | Olive | | | | | |
| Do | 2-(2',3'-hydroxynaphthoylamino)-3-methoxy-diphenylene-oxide. | Dark blue | Gray-black. | Garnet | | | | |
| Do | 1-(5'-hydroxy-1',2'-1'',2''-benzo-carbazol-4'-carboylamino)-4-methoxybenzene. | Black | Black | Gray-black. | | | | |
| Do | terephthaloyl-bis-(1-acetylamino-2-methoxy-4-chloro-5-methyl-benzene. | Red-brown. | | Brown | | | | |
| 5-amino-3-methyl-4-(2'-chlorophenyl)-pyrazole. | 2,3-hydroxynaphthoyl-amino-benzene. | Dark blue | | Claret | | | | |
| Do | 1-(2',3'-hydroxy-naphthoylamino-)3-nitrobenzene. | ---do | | ---do | | | | |
| Do | 1-(2',3'-hydroxy-naphthoylamino)-naphthalene. | Reddish dark blue. | ---do | | | | | |
| Do | 1-(2',3'-hydroxy-naphthoylamino)-4-methoxybenzene. | ---do | | ---do | | | | |
| Do | 2-(2',3'-hydroxy-naphthoylamino)-naphthalene. | Dark blue | | ---do | Red-brown. | | Claret | |
| Do | 1-(2',3'-hydroxy-naphthoylamino)-2-methoxy-4-chloro-5-methyl-benzene. | ---do | | Blue calret. | | | | |
| Do | 1-(2',3'-hydroxy-naphthoylamino)-2-methoxybenzene. | ---do | Olive | ---do | | | | |
| Do | 1-(2',3'-hydroxy-naphthoylamino)-2-methylbenzene. | Reddish dark. | ---do | Claret | | | | |
| Do | 1-(2',3'-hydroxy-naphthoylamino)-4-chlorobenzene. | Dark blue | ---do | ---do | | | | |
| Do | 1-(2',3'-hydroxy-naphthoylamino)-2-methyl-4-chloro-benzene. | Reddish dark blue. | ---do | ---do | | | | |
| Do | 1-(2',3'-hydroxy-naphthoylamino)-2-methyl-4-methoxy-benzene. | ---do | Olive | ---do | | | | |
| Do | 1-(2',3'-hydroxy-naphthoylamino)-2,4-dimethoxy-5-chloro-benzene. | Dark blue | ---do | ---do | Red-brown. | | | |

| Diazo component | Coupling component | Tint | | | | | | |
|---|---|---|---|---|---|---|---|---|
| | | Copper complex compound | Cobalt complex compound | Nickel complex compound | Iron complex compound | Zinc complex compound | Manganese complex compound | Lead complex compound |
| Do | 1-(2',3'-hydroxynaphthoylamino)-2,5-dimethoxy-4-chlorobenzene. | Dark blue | | Claret | | | | |
| Do | 1-(2',3'-hydroxynaphthoylamino)-2,5-dimethoxybenzene. | ___do___ | | Blue claret. | | | | |
| Do | 2-(2',3'hydroxynaphthoylamino)-3-methoxy-diphenylene oxide. | ___do___ | Olive | Claret | | | | |
| Do | 1-(2',3'-hydroxynaphthoylamino)-2-methoxy-5-chlorobenzene. | ___do___ | | Blue claret. | | | | |
| Do | 1-(2',3'-hydroxynaphthoylamino)-2-ethoxybenzene. | ___do___ | | ___do___ | | | | |
| 5-amino-3,4-diphenyl-pyrazole. | 2-(2',3'-hydroxynaphthoylamino)-naphthalene. | Reddish dark blue. | Greenish gray. | Claret | Red-brown. | | Claret | |
| Do | 1-(2',3'-hydroxynaphtholy-amino)-2-methoxy-4-chloro-5-methylbenzene. | ___do___ | | ___do___ | | | | |
| Do | 1-(2',3'-hydroxynaphthoylamino)-4-chlorobenzene. | | | ___do___ | | | | |
| Do | 1-(2',3'-hydroxynaphthoylamino)-2-methyl-4-chlorobenzene. | | | ___do___ | | | | |
| Do | 1-(2',3'-hydroxynaphthoylamino)-2,4-dimethoxy-5-chlorobenzene. | Dark blue. | Greenish gray. | ___do___ | Red-brown. | | Claret | |
| Do | 1-(2',3'-hydroxynaphthoylamino)-2,5-dimethoxy-4-chlorobenzene. | Reddish dark blue. | | ___do___ | | | | |
| Do | 2-(2',3'hydroxynaphthoylamino)-3-methoxy-diphenylene oxide. | | | ___do___ | | | | |
| Do | 1-(2',3'-hydroxynaphthoylamino)-2-methoxy-5-chlorobenzene. | | | ___do___ | | | | |
| 5-amino-3-benzyl-4-phenyl-pyrazole. | 2,3-hydroxynaphthoylaminobenzene. | Reddish dark blue. | Gray black. | Garnet | | | | |
| Do | 1-(2',3'-hydroxynaphthoylamino)-3-nitrobenzene. | ___do___ | ___do___ | ___do___ | | | | |
| Do | 1-(2',3'-hydroxynaphthoylamino)-naphthalene. | ___do___ | ___do___ | Bluish garnet. | | | | |
| Do | 1-(2',3'-hydroxynaphthoylamino)-4-methoxybenzene. | ___do___ | ___do___ | ___do___ | | | | |
| Do | 2-(2',3'-hydroxynaphthoylamino)-naphthalene. | ___do___ | ___do___ | ___do___ | Red-brown. | | Claret | |
| Do | 1-(2',3'-hydroxynaphthoylamino)-2-methoxy-4-chloro-5-methylbenzene. | ___do___ | ___do___ | ___do___ | | | | |
| Do | 1-(2',3'-hydroxynaphthoylamino)-2-methoxybenzene. | ___do___ | ___do___ | Blue-garnet. | | | | |
| Do | 1-(2',3'-hydroxynaphthoylamino)-2-methylbenzene. | ___do___ | ___do___ | ___do___ | | | | |
| Do | 1-(2',3'-hydroxynaphthoylamino)-4-chlorobenzene. | ___do___ | ___do___ | ___do___ | | | | |
| Do | 1-(2',3'-hydroxynaphthoylamino)-2-methyl-4-chlorobenzene. | ___do___ | ___do___ | ___do___ | | | | |
| Do | 1-(2',3'-hydroxynaphthoylamino)-2-methyl-4-methoxybenzene. | ___do___ | ___do___ | Garnet | | | | |
| 5-amino-3-methyl-4-phenyl-pyrazole. | 1-(2',3'-hydroxynaphthoylamino)-2,5-dimethoxy-4-chlorobenzene. | Dark blue | ___do___ | Claret | Claret | | Claret | |
| Do | 1-(2'-hydroxycarbazole-3'-carboylamino)-4-chlorbenzene. | Reddish-dark blue. | Currant | Blue garnet. | Bluish brown. | | Bluish brown. | |
| Do | 1-(2'-hydroxyanthracene-3'-carboylamino)-2-methylbenzene. | Green | Blue green. | Green | | | | |
| Do | 2-(2',3'-hydroxynaphthoylamino)-3-methoxy-diphenylene oxide. | Dark blue | Gray-black. | Claret | | | | |
| Do | 1-(5'-hydroxy-1',2'-1'',2''-benzocarbazole-4'-carboylamino)-4-methoxybenzene. | Black | ___do___ | Gray black. | Bluish brown. | | Bluish brown. | |
| Do | terephthaloyl-bix-(1-acetylamino-2-methoxy-4-chloro-5-methylbenzene). | Yellowish brown. | | | | | | |
| 2-amino-3-cyanomethyl-4-cyanopyrazole. | 1-(2',3'-hydroxynaphthoylamino)-3-nitrobenzene. | Blue gray | Covered green. | Garnet | | | | |
| Do | 1-(2',3'-hydroxynaphthoylamino)-naphthalene. | ___do___ | ___do___ | ___do___ | | | | |
| 5-amino-3-benzyl-4-phenyl-pyrazole. | 1-(2',3'-hydroxynaphthoylamino)-2,4-dimethoxy-5-chlorobenzene. | Reddish dark blue. | Gray black. | ___do___ | Red-brown. | | Claret | |
| Do | 1-(2',3'-hydroxynaphthoylamino)-2,5-dimethoxy-4-chlorobenzene. | ___do___ | ___do___ | ___do___ | | | | |
| Do | 1-(2',3'-hydroxynaphthoylamino)-2,5-dimethoxybenzene. | ___do___ | ___do___ | Blue garnet. | | | | |
| Do | 2-(2',3'-hydroxynaphthoylamino)-3-methoxy-diphenylene oxide. | ___do___ | ___do___ | ___do___ | | | | |
| Do | 1-(2',3'-hydroxynaphthoylamino)-2-methoxy-5-chlorobenzene. | ___do___ | ___do___ | ___do___ | | | | |
| Do | 1-(2',3'-hydroxynaphthoylamino)-2-ethoxybenzene. | ___do___ | ___do___ | ___do___ | | | | |

| Diazo component | Coupling component | Tint | | |
|---|---|---|---|---|
| | | Copper complex compound | Cobalt complex compound | Nickel complex compound |
| 5-amino-3-methyl-pyrazole. | 2,3-hydroxynaphthoylaminobenzene. | Blue | | Claret. |
| Do | 1-(2',3'-hydroxynaphthoylamino)-3-nitrobenzene. | do | | Do. |
| Do | 2-(2',3'-hydroxynaphthoylamino)-naphthalene. | do | | Do. |
| Do | 1-(2',3'-hydroxynaphthoylamino)-2-methoxybenzene. | do | | Do. |
| Do | 1-(2',3'hydroxynaphthoylamino)-4-chlorobenzene. | do | | Do. |
| Do | 1-(2',3'-hydroxynaphthoylamino)-2,4-dimethoxy-5-chlorobenzene. | do | | Do. |
| Do | 1-(2',3'-hydroxynaphthoylamino)-2-methyl-4-chlorobenzene. | do | | Do. |
| Do | 1-(2'-hydroxycarbazole-3'-carboylamino) 4-chlorobenzene. | Violet | | Brown. |
| Do | 1-(2'-hydroxyanthracene-3'-carboylamino)-2-methylbenzene. | Bluish-green. | | |
| Do | 1-(5'-hydroxy-1',2'-1'',2''-benzocarbazole-4'-carboylamino)-4-methoxybenzene. | Black | | Black. |
| 5-amino-3-ethyl-4-phenyl-pyrazole (m.p. 168-169° C.). | 2,3-hydroxynaphthoyl-aminobenzene. | Dull violet. | Blackish currant. | Claret. |
| Do | 1-(2',3'-hydroxynaphthoylamino)-3-nitrobenzene. | do | do | Do. |
| Do | 1-(2',3'-hydroxynaphthoylamino)-naphthalene. | do | Reddish black-gray. | Do. |
| Do | 1-(2',3'-hydroxynaphthoylamino)-4-methoxybenzene. | do | do | Do. |
| Do | 2-(2',3'-hydroxynaphthoylamino)-naphthalene. | do | do | Do. |
| Do | 1-(2',3'-hydroxynaphthoylamino)-2-methoxybenzene. | do | do | Violet. |
| Do | 1-(2',3'-hydroxynaphthoylamino)-2-methylbenzene. | do | do | Claret. |
| Do | 1-(2',3'-hydroxynaphthoylamino)-4-chlorobenzene. | do | Black-currant. | Do. |
| Do | 1-(2',3'-hydroxynaphthoylamino)-2-methyl-4-chlorobenzene. | do | Reddish black. | Do. |
| Do | 1-(2',3'-hydroxynaphtholyamino)-2,4-dimethoxy-5-chlorobenzene. | do | do | Do. |
| Do | 1-(2'-hydroxycarbazole-3'-carboylamino)-4-chlorobenzene. | do | Black-currant. | Blue-garnet. |
| Do | 1-(2'-hydroxyanthracene-3'-carboylamino)-2-methylbenzene. | Green | Dull green. | Blue-green. |
| Do | 1-(2',3'-hydroxynaphthoylamino)-2-ethoxybenzene. | Dull violet. | | Violet. |
| Do | 2-(2',3'-hydroxynaphthoylamino)-3-methoxy-diphenylene oxide. | do | | Claret. |
| Do | 1-(5'-hydroxy-1',2',1'',2''-benzocarbazole-4'-carboylamino)-4-methoxybenzene. | Black-blue. | | Black. |
| Do | Terephthaloyl-bis-(1-acetylamino-2-methoxy-4-chloro-5-methylbenzene). | Red-brown | | |
| Do | 1-(2',3'-hydroxynaphthoylamino)-2-methyl-5-chlorobenzene. | Dull violet | | Violet. |
| Do | 1-(2',3'-hydroxynaphthoylamino)-2-methoxy-5-chlorobenzene. | do | | Do. |
| 5-amino-3-ethyl-4-phenyl-pyrazole (m.p. 186-169° C.) | 1-(2'-3'-hydroxynaphthoylamino)-4-ethoxybenzene. | Dull violet. | | Claret. |
| 5-amino-3-n-propyl-4-phenyl-pyrazole (m. p. 88-89° C.) | 2,3-hydroxynaphthoyl-amino-benzene. | do | Blackish currant. | Do. |
| Do | 1-(2'-3'-hydroxynaphthoylamino)-3-nitrobenzene. | do | do | Do. |
| Do | 1-(2',3'-hydroxynaphthoylamino)-naphthalene. | do | do | Do. |
| Do | 1-(2',3'-hydroxynaphthoylamino)-4-methoxybenzene. | do | do | Do. |
| Do | 2-(2',3'-hydroxynaphthoylamino)-naphthalene. | do | do | Do. |
| Do | 1-(2',3'-hydroxynaphthoylamino)-2-methoxybenzene. | do | do | Do. |
| Do | 1-(2',3'-hydroxynaphthoylamino)-2-methylbenzene. | do | do | Do. |
| Do | 1-(2',3'-hydroxynaphthoylamino)-4-chlorobenzene. | do | do | Do. |
| Do | 1-(2',3'-hydroxynaphthoylamino)-2-methyl-4-chlorobenzene. | do | do | Do. |
| Do | 1-(2',3'-hydroxynaphthoylamino)-2,4-dimethoxy-5-chlorobenzene. | do | do | Do. |
| Do | 1-(2'-hydroxycarbazole-3'-carboylamino)-4-chlorobenzene. | do | do | Garnet. |
| Do | 1-(2'-hydroxyanthracene-3'-carboylamino)-2-methylbenzene. | Green | Dull green. | Green. |
| Do | 1-2',(3'-hydroxynaphthoylamino)-2-ethoxybenzene. | Dull Violet. | Blackish currant. | Claret. |
| Do | 2-(2',3'-hydroxynaphthoylamino)-3-methoxy-diphenylene oxide. | do | do | Do. |
| Do | 1-(5'-hydroxy-1',2',1'',2''-benzo-carbazole-4'-carboylamino)-4-methoxybenzene. | Black | | Black-gray. |
| Do | terephthaloyl-bis-(1-acetylamino-2-methoxy-4-chloro-5-methylbenzene). | Red brown. | | |
| Do | 1-(2',3'-hydroxynaphthoylamino)-2-methyl-5-chlorobenzene. | Dull violet. | Blackish currant. | Claret. |
| Do | 1-(2',3'-hydroxynaphthoylamino)-2-methyoxy-5-chlorobenzene. | do | do | Do. |
| Do | 1-(2',3'-hydroxynaphthoylamino)-4-ethoxybenzene. | do | do | Do. |
| 5-amino-3-(4'-methyl)-phenyl-pyrazole. | 2,3-hydroxynaphthoyl-aminobenzene. | Currant | | Do. |
| Do | 1-(2',3'-hydroxynaphthoylamino)-3-nitrobenzene. | do | Brown-green. | Brown-claret. |
| Do | 1-(2',3'-hydroxynaphthoylamino)-naphthalene. | do | Dull green. | Claret. |
| Do | 1-(2',3'-hydroxynaphthoylamino)-4-methoxybenzene. | do | Gray-green. | Brown-claret. |
| Do | 2-(2',3'-hydroxynaphthoylamino)-naphthalene. | do | do | Do. |
| Do | 1-(2',3'-hydroxy naphthoylamino)-2-methoxybenzene. | do | Dull green. | Claret. |
| Do | 1-(2',3'-hydroxynaphthoylamino)-2-methylbenzene. | do | do | Do. |
| Do | 1-(2',3'-hydroxynaphthoylamino)-4-chlorobenzene. | do | | Brown-claret. |
| Do | 1-(2',3'-hydroxynaphthoylamino)-2-methyl-4-chlorobenzene. | do | Dull green. | Claret. |

| Diazo component | Coupling component | Tint | | |
|---|---|---|---|---|
| | | Copper complex compound | Cobalt complex compound | Nickel complex compound |
| 5-amino-3-(4'-methyl)-phenyl-pyrazole. | 1-(2',3'-hydroxy-naphthoylamino)-2,4-dimethoxy-5-chlorobenzene. | Currant | Dull green | Claret. |
| Do | 1-(2'-hydroxy-carbazole-3'-carboylamino)-4-chlorobenzene. | ___do___ | | Brown. |
| Do | 1-(2'-hydroxyanthracene-3'-carboylamino)-2-methylbenzene. | Blue-green. | Green___ | Blue-gray. |
| Do | 1-(2',3'-hydroxy naphthoylamino) 2-ethoxybenzene. | Currant_ | ___do___ | Claret. |
| Do | 2-(2',3'-hydroxy-naphthoylamino)-3-methoxy-diphenylene oxide. | ___do___ | Dull green. | Brown-claret. |
| Do | 1-(5'-hydroxy-1',2', 1'',2''-benzocarbazole-4'-carboylamino)-4-methoxy benzene | Black___ | Currant. | Blue-garnet. |
| Do | Terephthaloyl bis-(1 acetylamino 2 methoxy 4 chloro 5 methylbenzene). | Brown__ | | |
| Do | 1 (2',3' hydroxy naphthoylamino) 2 methyl-5-chlorobenzene. | Currant. | | Claret. |
| Do | 1-(2',3'-hydroxy-naphthoylamino)-2-methoxy-5-chlorobenzene. | ___do___ | | Do. |
| Do | 1-(2', 3'-hydroxy-naphthoylamino)-4-ethoxybenzene. | ___do___ | | Brown-claret. |
| 5-amino 3-phenyl-4-methyl-pyrazole (m. p. 45–47° C.). | 2, 3-hydroxynaphthoylaminobenzene. | Dull violet. | Black green. | Claret. |
| Do | 1-(2', 3'-hydroxy-naphthoylamino)-3-nitrobenzene. | ___do___ | ___do___ | Do. |
| Do | 2-(2', 3'-hydroxy-napthoylamino)-naphthalene. | ___do___ | ___do___ | Brown-claret. |
| Do | 1-(2', 3'-hydroxy-naphthoylamino)-2-methoxybenzene. | ___do___ | ___do___ | Claret. |
| Do | 1-(2', 3'-hydroxy-naphthoylamino)-4-chlorobenzene. | ___do___ | ___do___ | Brown-claret. |
| Do | 1-(2', 3'-hydroxy-naphthoylamino)-2-methyl-4-chlorobenzene. | ___do___ | ___do___ | Claret. |
| 5-amino-3-(4'-chloro)-phenyl-pyrazole (m. p. 173–174° C.). | 2, 3-hydroxynaphthoylaminobenzene. | ___do___ | Gray-green. | |
| Do | 1-(2', 3'-hydroxy-naphthoylamino)-3-nitrobenzene. | ___do___ | ___do___ | |
| Do | 1-(2', 3'-hydroxy-naphthoylamino)-naphthalene. | ___do___ | ___do___ | Do. |
| Do | 1-(2', 3'-hydroxy-naphthoylamino)-4-methoxybenzene. | ___do___ | ___do___ | |
| Do | 2-(2', 3'-hydroxy-naphthoylamino)-naphthalene. | ___do___ | ___do___ | |
| Do | 1-(2', 3'-hydroxy-naphthoylamino)-2-methoxybenzene. | ___do___ | ___do___ | |
| Do | 1-(2', 3'-hydroxy-naphthoylamino)-2-methylbenzene. | ___do___ | ___do___ | Do. |
| Do | 1-(2',3'-hydroxy-naphthoylamino)-4-chlorobenzene | ___do___ | ___do___ | |
| Do | 1-(2',3'-hydroxy-naphthoylamino)-2-methyl-4-chlorobenzene. | ___do___ | ___do___ | Do. |
| Do | 1-(2',3'-hydroxy-naphthoylamino)-2,4-dimethoxy-5-chloro-benzene. | ___do___ | ___do___ | |
| Do | 1-(2'-hydroxycarbazole-3'-carboylamino)-4-chlorobenzene. | ___do___ | | |
| Do | 1-(2'-hydroxyanthracene-3'-carboylamino)-2-methylbenzene. | Green___ | Green___ | |
| 5-amino-3-(4'-chloro)-phenyl-pyrazole (m. p. 173–174° C.) | 1-(2',3'-hydroxy-naphthoylamino)-2-ethoxybenzene. | Dull violet. | Gray-green. | |
| Do | 2-(2'-3'-hydroxy-naphthoylamino)-3-methoxy-diphenylene oxide. | ___do___ | ___do___ | |
| Do | 1-(5'-hydroxy-1',2', 1'',2''-benzo-carbazole-4'-carboylamino)-4-methoxybenzene. | Black-gray. | | |
| Do | 1-(2',3'-hydroxy-naphthoylamino)-2-methyl-5-chloro-benzene. | Dull violet. | Gray-green. | Do. |
| Do | 1-(2',3'-hydroxy-naphthoylamino)-2-methoxy-5-chloro-benzene. | ___do___ | ___do___ | |
| Do | 1-(2',3'-hydroxy-naphthoylamino)-4-ethoxybenzene. | ___do___ | ___do___ | |

We claim:
1. Complex metal compounds selected from the group consisting of complex copper, cobalt nickel and iron compounds of water-insoluble azo-dyestuffs having the formula

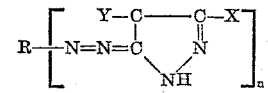

wherein X represents a member selected from the group consisting of hydrogen, methyl, ethyl, propyl, methyl cyanide, phenyl, methylphenyl, chlorophenyl and benzyl, Y represents a member selected from the group consisting of hydrogen, methyl, cyanogen, phenyl and chlorophenyl, R represents the radical of a coupling component selected from the group consisting of arylamides of 2-hydroxy-naphthalene-3-carboxylic acid, 2-hydroxyanthracene-3-carboxylic acid, 2-hydroxycarbazole-3-carboxylic acid, 5-hydroxy-1,2,1',2'-benzocarbazole-4-carboxylic acid, 3-hydroxy-diphenylene oxide-2-carboxylic acid and terephthaloyl-bis-acetic acid, the arylamide radical being selected from the group consisting of the benzene, naphthalene and diphenylene oxide series, and $n$ means one of the integers 1 and 2.

2. The complex cobalt compound of the water-insoluble monoazo-dyestuff having the formula

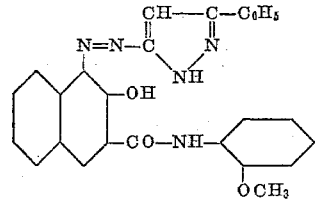

3. The complex cobalt compound of the water-insoluble monazo-dyestuff having the formula

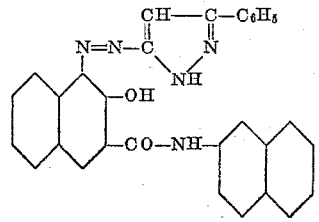

4. The complex cobalt compound of the water-insoluble monoazo-dyestuff having the formula
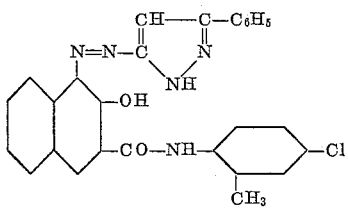
5. The complex copper compound of the water-insoluble monoazo-dyestuff having the formula
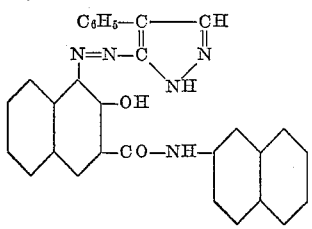
6. The complex copper compound of the water-insoluble monoazo-dyestuff having the formula
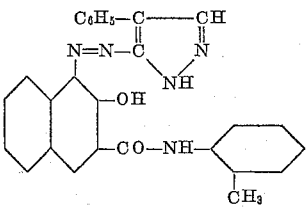
References Cited in the file of this patent
UNITED STATES PATENTS
2,095,484    Taube et al. _____ Oct. 12, 1937